United States Patent [19]

Tsujimoto

[11] Patent Number: 5,552,764
[45] Date of Patent: Sep. 3, 1996

[54] ALARM DETECTING SYSTEM FOR REDUNDANCY CONFIGURATION CIRCUIT

[75] Inventor: Hideyuki Tsujimoto, Hyogo, Japan

[73] Assignee: Mitsubishi Denki Kabushiki Kaisha, Tokyo, Japan

[21] Appl. No.: 8,136

[22] Filed: Jan. 25, 1993

[30] Foreign Application Priority Data

Feb. 3, 1992 [JP] Japan ..................................... 4-046367

[51] Int. Cl.⁶ .................................................. G08B 29/16
[52] U.S. Cl. ........................... 340/508; 340/527; 340/507; 364/187
[58] Field of Search .................................... 340/500, 501, 340/506, 507, 508, 527, 522; 371/8.2; 455/8; 364/187

[56] References Cited

U.S. PATENT DOCUMENTS

| | | | |
|---|---|---|---|
| 4,215,340 | 7/1980 | Lejon | 340/508 |
| 4,331,952 | 5/1982 | Galvin et al. | 340/508 |
| 4,402,903 | 9/1983 | Lenderking | 340/508 |
| 4,562,528 | 12/1985 | Baba | 364/133 |
| 4,611,197 | 9/1986 | Sansky | 340/527 |
| 4,630,265 | 12/1986 | Sexton | 340/825.01 |
| 4,794,376 | 12/1988 | Lloyd et al. | 340/508 |

FOREIGN PATENT DOCUMENTS 2226935  9/1990  Japan.
2249332  10/1990  Japan.

*Primary Examiner*—John K. Peng
*Assistant Examiner*—Daniel J. Wu
*Attorney, Agent, or Firm*—Rothwell, Figg, Ernst & Kurz

[57] ABSTRACT

In a receiving circuit which serves as a system in use, a gate circuit is enabled in response to a specifying signal. In a receiving circuit which serves as a backup system, a gate circuit is enabled in response to a specifying signal. When no signal is applied to an input terminal, alarm detection signals are outputted. However, a system-in-use/backup-system specifying circuit is first supplied with the alarm detection signal of the backup system. Thus, the system-in-use/backup-system specifying circuit determines or detects that the receiving circuit serving as the system in use is normal.

2 Claims, 3 Drawing Sheets

ALARM DETECTING SYSTEM FOR REDUNDANCY CONFIGURATION CIRCUIT

BACKGROUND OF THE INVENTION

1. Field of the Invention

The present invention relates to an alarm detecting system suitable for use in a redundancy configuration circuit, for effecting the action of switching between respective redundantly-configured circuits employed in radio equipment or the like.

2. Description of the Related Art

FIG. 1 is a block diagram showing the structure of an alarm detecting system suitable for use in a conventional redundancy configuration circuit. In the same drawing, reference numerals 40a, 40b respectively indicate receiving circuits which receive a signal supplied from an input terminal 11 and are set up in redundant configurations. Reference numerals 2a, 2b respectively indicate alarm detecting circuits of the receiving circuits 40a, 40b. Further, designated by numeral 3 is a system-in-use/backup-system specifying circuit for outputting specifying signals 13a, 13b therefrom in response to alarm detection signals 12a, 12b supplied from the alarm detecting circuits 2a, 2b, respectively.

The operation of the alarm detecting system will now be described below. Let's now assume that the receiving circuit 40a is of a system in use and the remaining receiving circuit 40b is of a backup system. When a failure or malfunction occurs in the receiving circuit 40a, the alarm detecting circuit 2a detects it and brings the alarm detection signal 12a into a significant condition (alarm detected condition). It is needless to say that the receiving circuit 40b does not detect the malfunction and bring the alarm detection signal 12b into the significant condition.

That is, the system-in-use/backup-system specifying circuit 3 senses only the significant condition of the alarm detection signal 12a. As a result, the system-in-use/backup-system specifying circuit 3 recognizes that the receiving circuit 40a which is of the system in use, is in an improper state. Based on the result of the recognition, the system-in-use/backup-system specifying circuit 3 then outputs the specifying signal 13a so as to bring the receiving circuit 40a to the backup system and outputs the specifying signal 13b so as to bring the receiving circuit 40b serving as the backup system to the system in use. The receiving circuits 40a, 40b respectively effect a changeover from a function of the system in use to a function of the backup system or vise versa in response to the specifying signals 13a, 13b.

When the application of a signal to the input terminal 11 is stopped owing to external factors, the alarm detecting circuits 2a, 2b respectively detect that the application of the signal thereto has been stopped and bring the alarm detection signals 12a 12b into the significant condition. When the system-in-use/backup-system specifying circuit 3 detects the two alarm detection signals, it recognizes that a failure or malfunction has been produced by the external factors, and does not output the specifying signals 13a, 13b. That is, the action of switching between the system in use and the backup system is not effected.

Incidentally, there is known a technique disclosed in Japanese Patent Application Laid-Open Publication No. 2-226935 as a prior art.

The alarm detecting system for the conventional redundancy configuration circuit is constructed as described above. Thus, when the two alarm detection signals 12a, 12b are brought into the significant condition owing to the external factors, the difference is produced between the timing for outputting the alarm detection signal 12a and the timing for outputting the alarm detection signal 12b according to the difference in detection time between the two alarm detecting circuits 2a and 2b. When the alarm detection signal 12a of the system in use is first brought to the significant condition, the system in use is sometimes switched over to the backup system when unnecessary.

SUMMARY OF THE INVENTION

It is an object of the present invention to provide an alarm detecting system suitable for use in a redundancy configuration circuit, which is capable of avoiding the action of switching between a system in use and a backup system when an improper state produced owing to external factors, other than an improper state of each receiving circuit, is detected.

It is another object of the present invention to provide an alarm detecting system suitable for use in a redundancy configuration circuit, which enables the above object by using only a single delay circuit.

According to one aspect of the present invention, for achieving the above objects, there is provided an alarm detecting system suitable for use in a redundancy configuration circuit, comprising receiving circuits respectively including delay circuits for delaying the alarm detection signals when the respective ones of the receiving circuits are brought to systems in use and for supplying the same to system-in-use/backup-system specifying circuits respectively.

According to another aspect of the present invention, for achieving the above objects, there is provided an alarm detecting system suitable for use in a redundancy configuration circuit, comprising delay units respectively supplied with alarm detection signals, for delaying only the alarm detection signals of systems in use so as to be supplied to system-in-use/backup-system specifying circuits.

According to the alarm detecting system of the present invention, which is suitable for use in the redundancy configuration circuit, the respective receiving circuits are provided with the delay circuits for delaying the alarm detection signals when the respective ones of the receiving circuits are brought to the systems in use and for supplying the same to the system-in-use/backup-system specifying circuits respectively. Thus, when it is unnecessary to effect the action of switching between the system in use and the backup system though the respective alarm detection signals are brought to the significant condition, the alarm detection signals from the systems-in-use are delayed and reliably supplied to the system-in-use/backup-system specifying circuits.

Further, according to the alarm detecting system of the present invention, which is suitable for use in the redundancy configuration circuit, there are provided delay units respectively supplied with the alarm detection signals, for delaying only the alarm detection signals of the systems in use so as to be supplied to the system-in-use/backup-system specifying circuits. Thus, when it is unnecessary to effect the action of switching between the system in use and the backup system though the respective alarm detection signals are brought to the significant condition, the alarm detection signals of the systems in use are time-delayed and reliably supplied to the system-in-use/backup-system specifying circuits.

The above and other objects and novel features of the present invention will become more apparent from the following detailed description and the appended claims, taken in conjunction with the accompanying drawings. However, the accompanying drawings are used only for illustration and will not limit the scope of the invention.

DETAILED DESCRIPTION OF THE PREFERRED EMBODIMENTS

Preferred embodiments of the present invention will hereinafter be described in detail with reference to the accompanying drawings.

Figure 1:
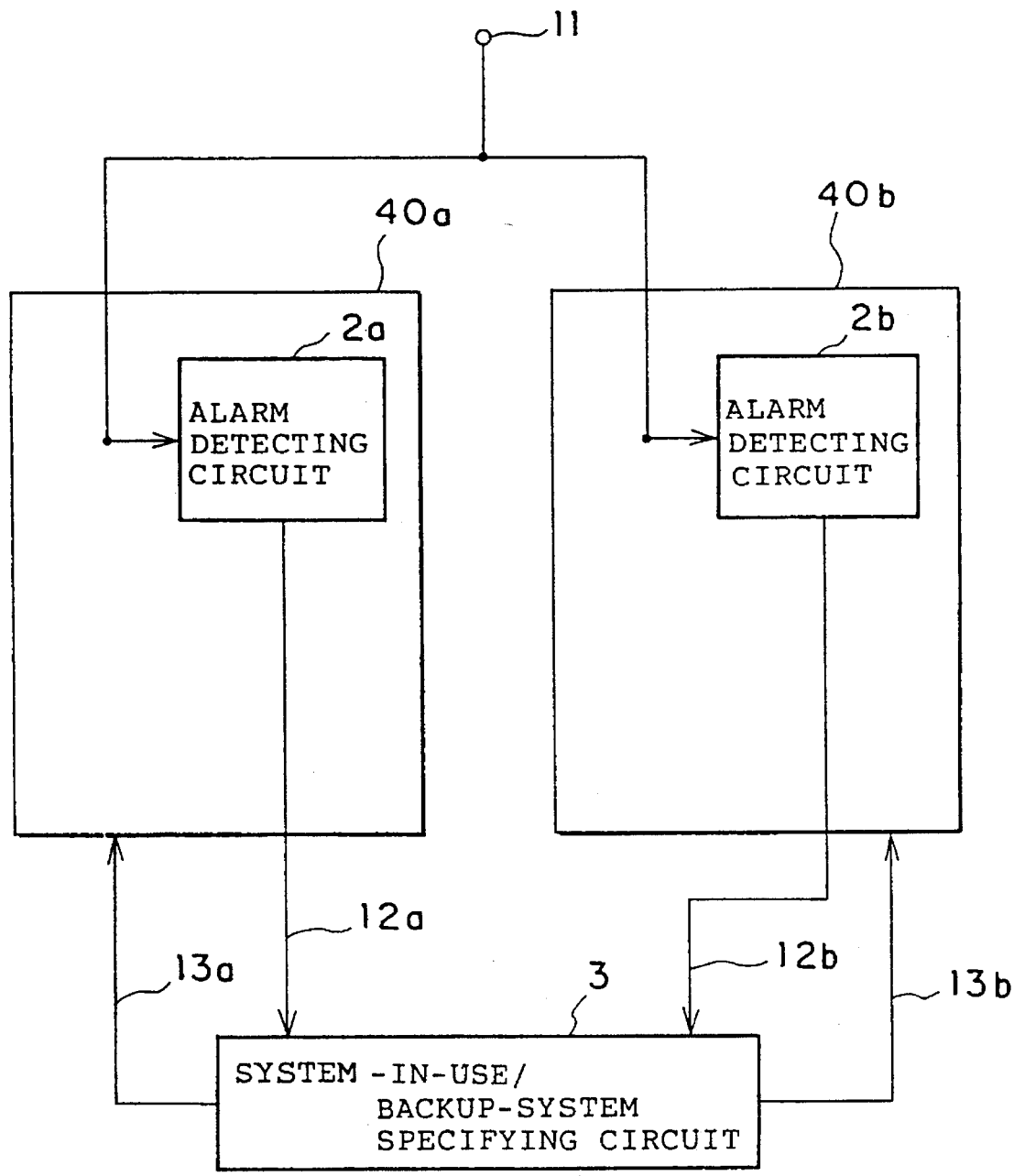
FIG. 1 is a block diagram showing a conventional alarm detecting system suitable for use in a redundancy configuration circuit.
Figure 2:
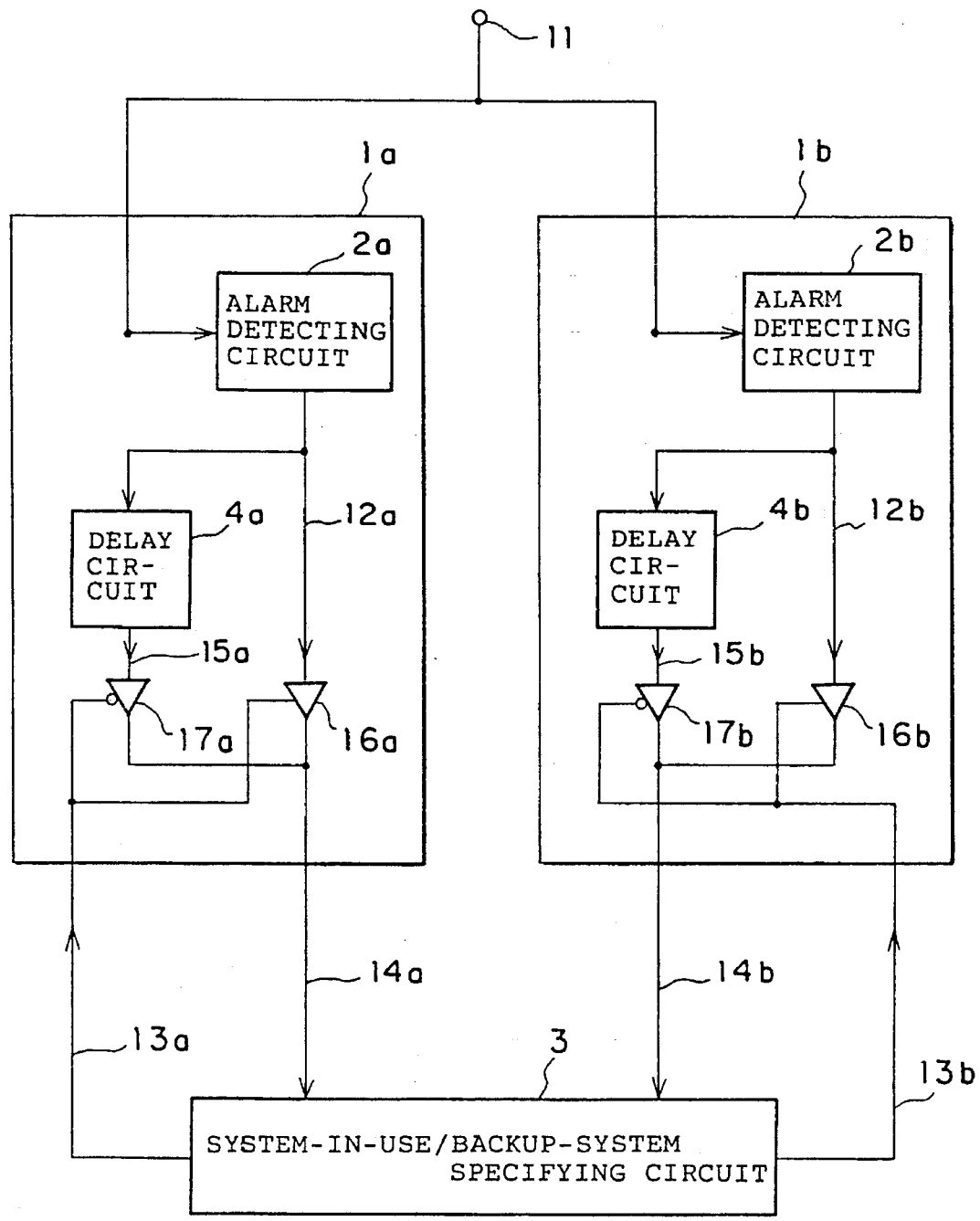
FIG. 2 is a block diagram showing an alarm detecting system according to one embodiment of the present invention, which is suitable for use in a redundancy configuration circuit.

FIG. 2 is a block diagram showing an alarm detecting system suitable for use in a redundancy configuration circuit, according to a first embodiment of the present invention. In the same drawing, the same reference numerals as those already shown in FIG. 1 indicate the same elements of structure as those shown in FIG. 1, and their detailed description will therefore be omitted.

In FIG. 2, reference numerals 4a, 4b respectively indicate delay circuits for delaying alarm detection signals 12a, 12b so as to output time-delayed alarm signals 15a, 15b, respectively. Reference numerals 16a, 17a respectively indicate three-state gate circuits which are enabled or disabled in response to a specifying signal 13a. Designated by numerals 16b, 17b are three-state gate circuits which are enabled or disabled in response to a specifying signal 13b.

The operation of the present embodiment will now be described below.

Let's now assume that a receiving circuit 1a is of a system in use and a receiving circuit 1b is of a preliminary or backup system. Accordingly, the specifying signal 13a is used to specify the system in use (it is regarded as being "L" level), whereas the specifying signal 13b is used to specify the backup system (it is regarded as being "H" level). Thus, an alarm output 14a inputted to a system-in-use/backup-system specifying circuit 3 corresponds to a delayed alarm signal 15a supplied through the gate circuit 17a. On the other hand, an alarm output 14b inputted to the system-in-use/backup-system specifying circuit 3 is of an alarm detection signal 12b supplied through the gate circuit 16b.

Let's now assume that each of the two receiving circuits 1a, 1b has detected the non-application of a signal by external factors. In doing so, two alarm detecting circuits 2a, 2b bring the alarm detection signals 12a, 12b into significant conditions. Since the receiving circuit 1a is of the system in use, the gate circuit 17a is rendered active so as to produce the delayed alarm signal 15a as the alarm output 14a as it is. Since, on the other hand, the receiving circuit 1b is of the backup system, the gate circuit 16b is enabled to generate the alarm detection signal 12b as the alarm output 14b as it is.

If the time required for the delay circuits 4a, 4b to delay the alarm detection signals 12a, 12b is set so as to be larger than the maximum value indicative of the difference in detection time between the alarm detecting circuits 2a and 2b, then the system-in-use/backup-system specifying circuit 3 receives the alarm output 14b which is first made active at all times. That is, the system-in-use/backup-system specifying circuit 3 first detects a failure or malfunction of the backup system in response to the alarm output 14b. Thus, the system-in-use/backup-system specifying circuit 3 recognizes that the system in use is normal, and hence does not effect a changeover from the system in use to the backup system.

So long as the system-in-use/backup-system specifying circuit 3 detects an alarm in response to the alarm outputs 14a, 14b, that is, detects an alarm based on the alarm output which has been firstly brought to the significant condition, the system-in-use/backup-system specifying circuit 3 does not carry out the system switching action even when a desired signal is not inputted to an input terminal 11 (i.e., even when it is unnecessary to effect the action of switching between the system in use to the backup system).

Figure 3:
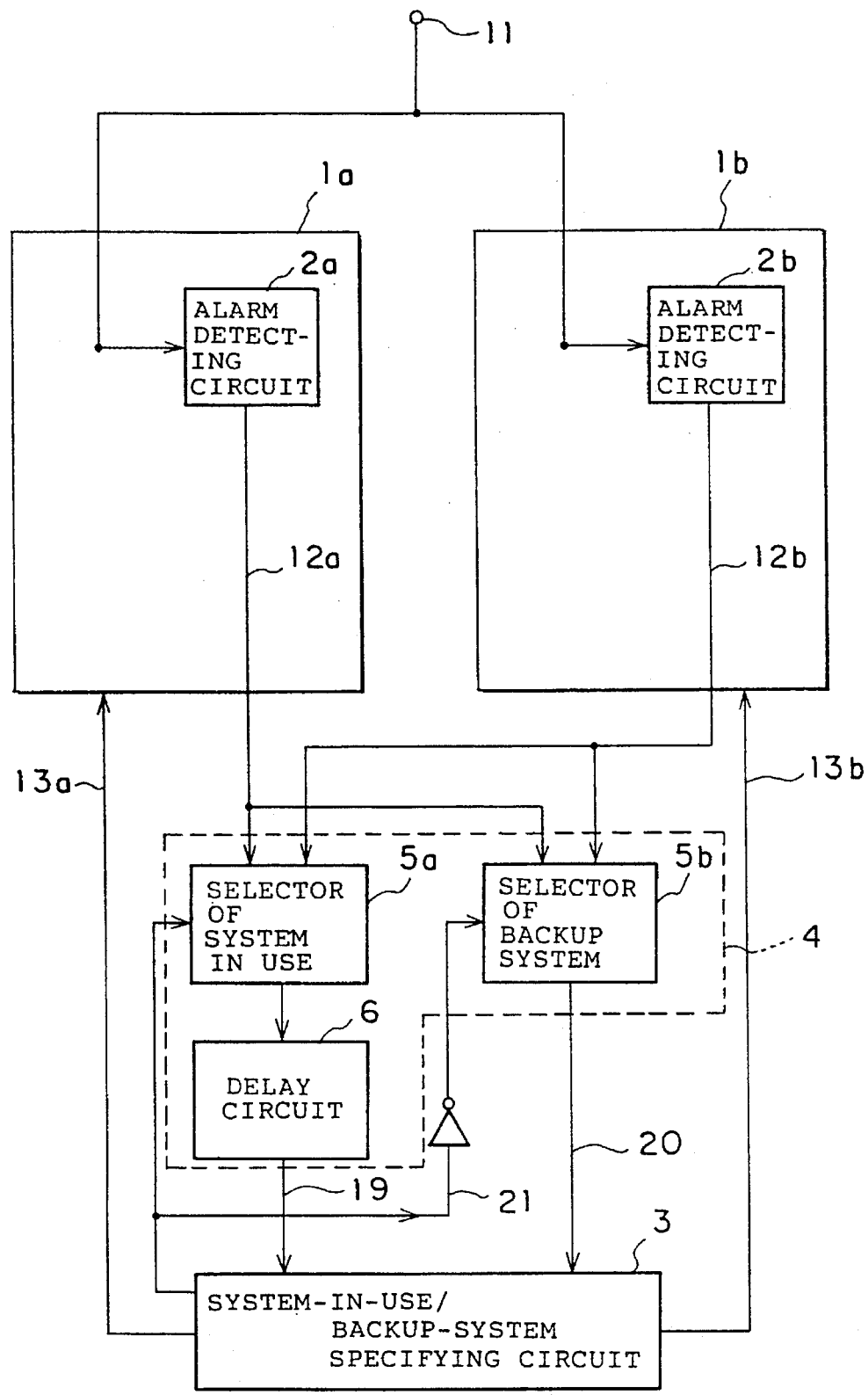
FIG. 3 is a block diagram illustrating an alarm detecting system according to another embodiment of the present invention, which is suitable for use in a redundancy configuration circuit.

FIG. 3 is a block diagram showing an alarm detecting system of a redundancy configuration circuit, according to a second embodiment of the present invention. The first embodiment describes the case where the two delay circuits 4a, 4b are required. In the present embodiment, a single delay circuit may be provided. In FIG. 3, reference numeral 4 indicates a delay unit. Reference numeral 5a indicates a selector of a system-in-use of the delay unit 4, for selecting an alarm detection signal 12a of the system in use in response to a selection signal 21 outputted from a system-in-use/backup-system specifying circuit 3. Reference numeral 5a indicates a selector of a backup system, for selecting an alarm detection signal of the backup system. Reference numeral 19 indicates an alarm output of the system in use, and reference numeral 20 indicates an alarm output of the backup system. Further, reference numeral 6 denotes a delay circuit provided in the outside of receiving circuits 1a, 1b.

The operation of the present embodiment will now be described below.

Even in the present embodiment, the receiving circuit 1a is regarded as the system in use. The selector 5a of the system in use selects the alarm detection signal 12a in response to the selection signal 21 and outputs the same as an output signal 19. Thus, the alarm detection signal 12a, which has been time-delayed by the delay circuit 6, is supplied to the system-in-use/backup-system specifying circuit 3 as the alarm output 19. The selector 5b of the backup system selects an alarm detection signal 12b and outputs it as the alarm output 20. The system-in-use/backup-system specifying circuit 3 is supplied with, as an alarm output, an alarm detection signal 12b of the backup system, which is not subjected to the time delay.

Accordingly, the system-in-use/backup-system specifying circuit 3 is operated in a manner similar to that employed in the first embodiment. Even when a desired signal is not supplied to an input terminal 11 (i.e., even when it is unnecessary to effect the action of switching between the system in use and the backup system), the system-in-use/backup-system specifying circuit 3 does not perform the system switching action.

According to the present invention, as has been described above, each of receiving circuits is provided with a delay circuit for time-delaying an alarm detection signal when a system in use is selected and supplying it to a system-in-use/backup-system specifying circuit. Therefore, when it is unnecessary to effect the action of switching between the system in use and the backup system though each alarm detection signal has been brought to a significant condition, the alarm detection signal of the system in use is delayed and reliably supplied to the system-in-use/backup-system specifying circuit. Thus, when a malfunction or an improper state produced by external factors, other than an improper state developed in each receiving circuit, is detected, the action of switching between the system in use and the backup system can be avoided.

According to the present invention as well, there is provided a delay circuit supplied with each alarm detection signal and which delays only an alarm detection signal of the system in use so as to be supplied to a system-in-use/backup-system specifying circuit. When it is unnecessary to effect the action of switching between the system in use and the backup system though each alarm detection signal has been brought to a significant condition, the alarm detection signal of the system in use is time-delayed and reliably supplied to the system-in-use/backup-system specifying circuit. Thus, when a malfunction or an improper state produced by external factors, other than an improper state developed in each receiving circuit is detected, the action of switching between the system in use and the backup system can be avoided. Further, only a single delay circuit may be provided.

Having now fully described the invention, it will be apparent to those skilled in the art that many changes and modifications can be made without departing from the spirit or scope of the invention as set forth herein.

What is claimed is:

1. An alarm detecting system suitable for use in a redundancy configuration circuit, comprising:

at least two receiving circuits which respectively output alarm detection signals and is constructed in such a manner that one of said at least two receiving circuits serves as a system in use while the other of said at least two receiving circuits serves as a backup system; and a system-in-use/backup-system specifying circuit used to reset one of said at least two receiving circuits which is serving as a system in use as a backup system and to reset the other of said at least two receiving circuits as a system in use when an alarm detection signal is first received by said specifying circuit from said one of said at least two receiving circuits serving as a system in use, wherein each of said at least two receiving circuits includes a delay circuit for delaying only said alarm detection signal received by one of said at lest two receiving circuits serving as a system in use and for supplying said alarm detection signal to said system-in-use/backup-system specifying circuit.

2. An alarm detecting system suitable for use in a redundancy configuration circuit, comprising:

at least two receiving circuits which respectively output alarm detection signals and is constructed in such a manner that one of said at least two receiving circuits serves as a system in use while the other of said at least two receiving circuits serves as a backup system;

a system-in-use/backup-system specifying circuit used to reset one of said at least two receiving circuits which is serving as a system in use as a backup system and to reset the other of said at least two receiving circuits as a system in use when an alarm detection signal is first received by said specifying circuit from said one of said at least two receiving circuits serving as a system in use, and a delay unit supplied with said alarm detection signals from said receiving circuits for delaying only the alarm detection signal of one of said at least two receiving circuits serving as a system in use so as to be supplied to said system-in-use/backup-system specifying circuit.

* * * * *